Oct. 21, 1930.   A. A. JOHNSON   1,778,762
AUTOMATIC CLUTCH CONTROL FOR PHONOGRAPHS
Filed March 10, 1925   3 Sheets-Sheet 2
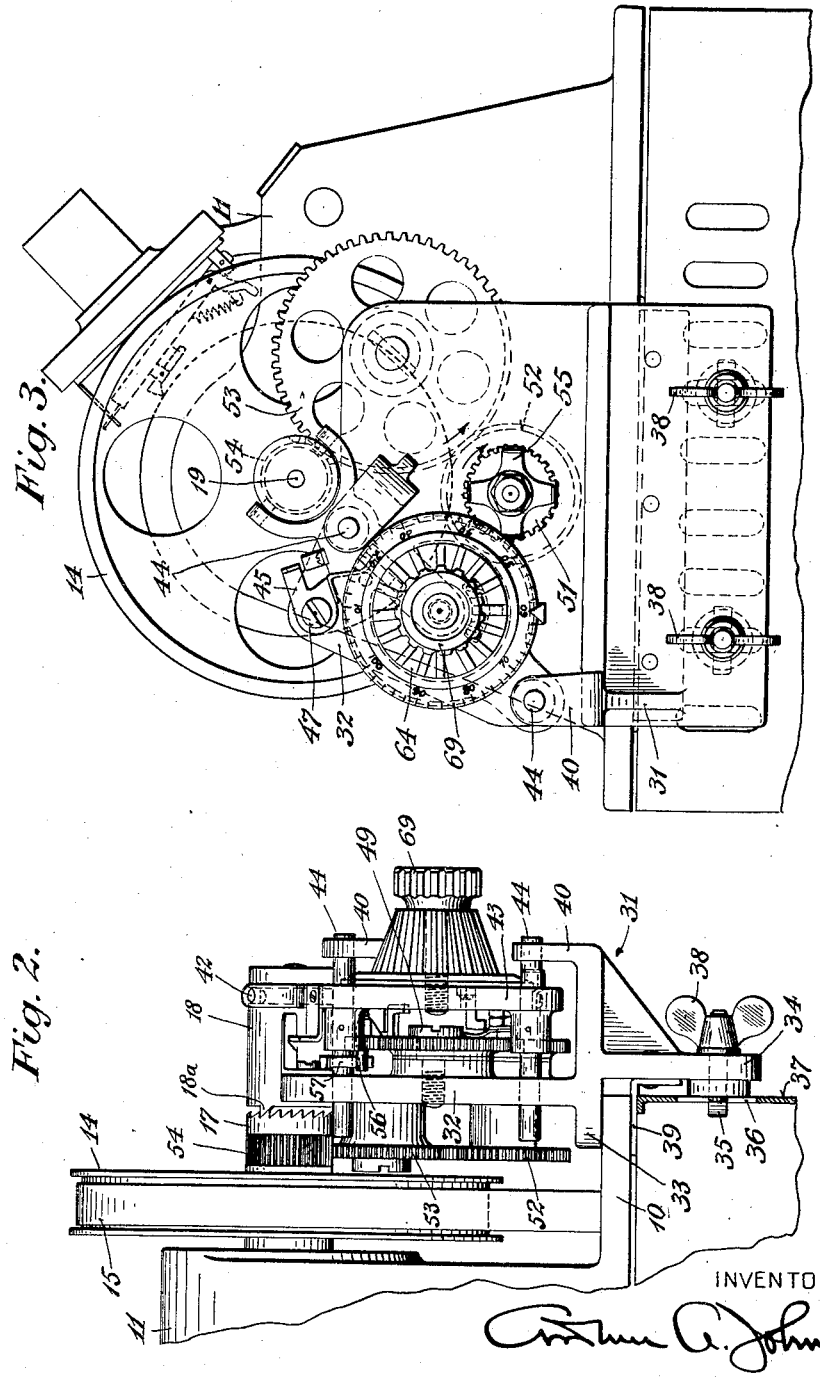
INVENTOR
Arthur A. Johnson Oct. 21, 1930.  A. A. JOHNSON  1,778,762
AUTOMATIC CLUTCH CONTROL FOR PHONOGRAPHS
Filed March 10, 1925  3 Sheets-Sheet 3
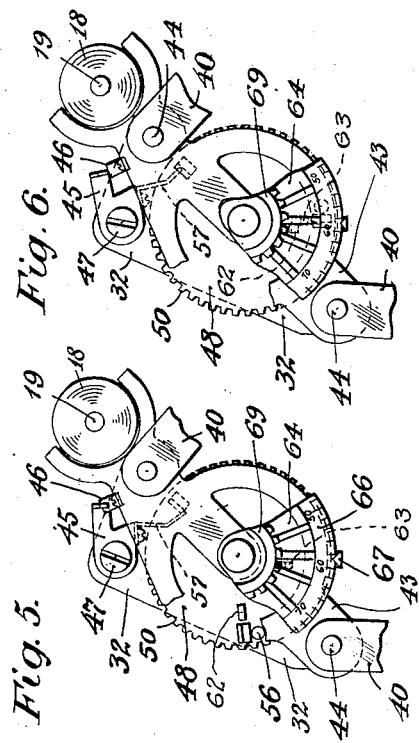
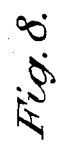
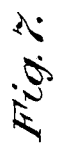
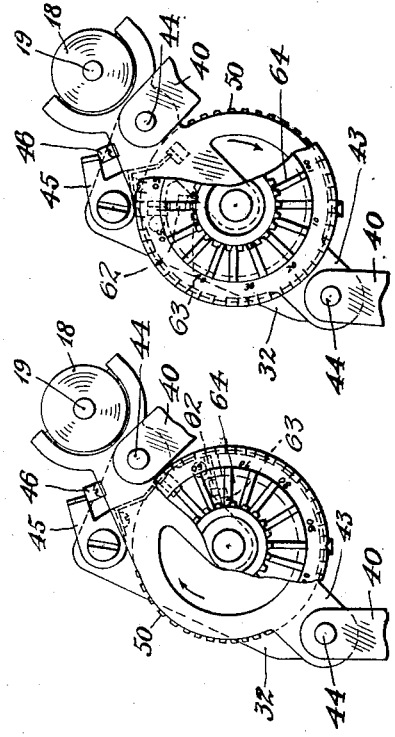
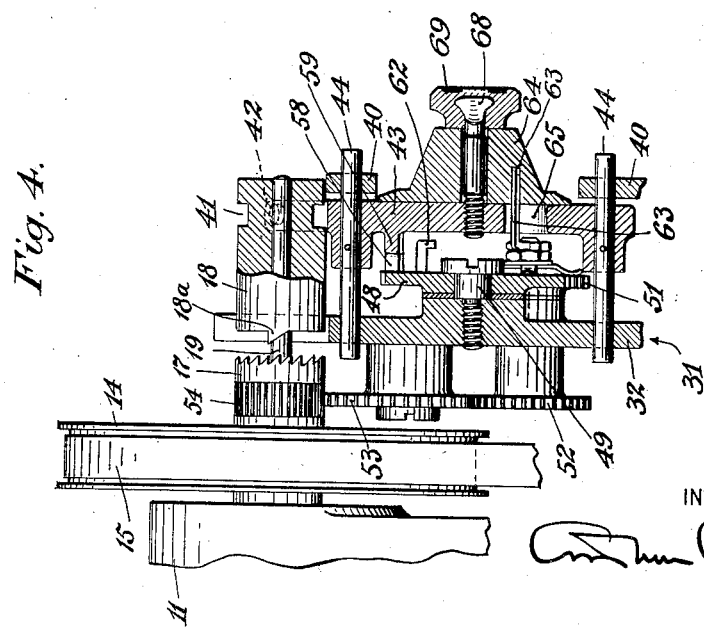
INVENTOR Patented Oct. 21, 1930

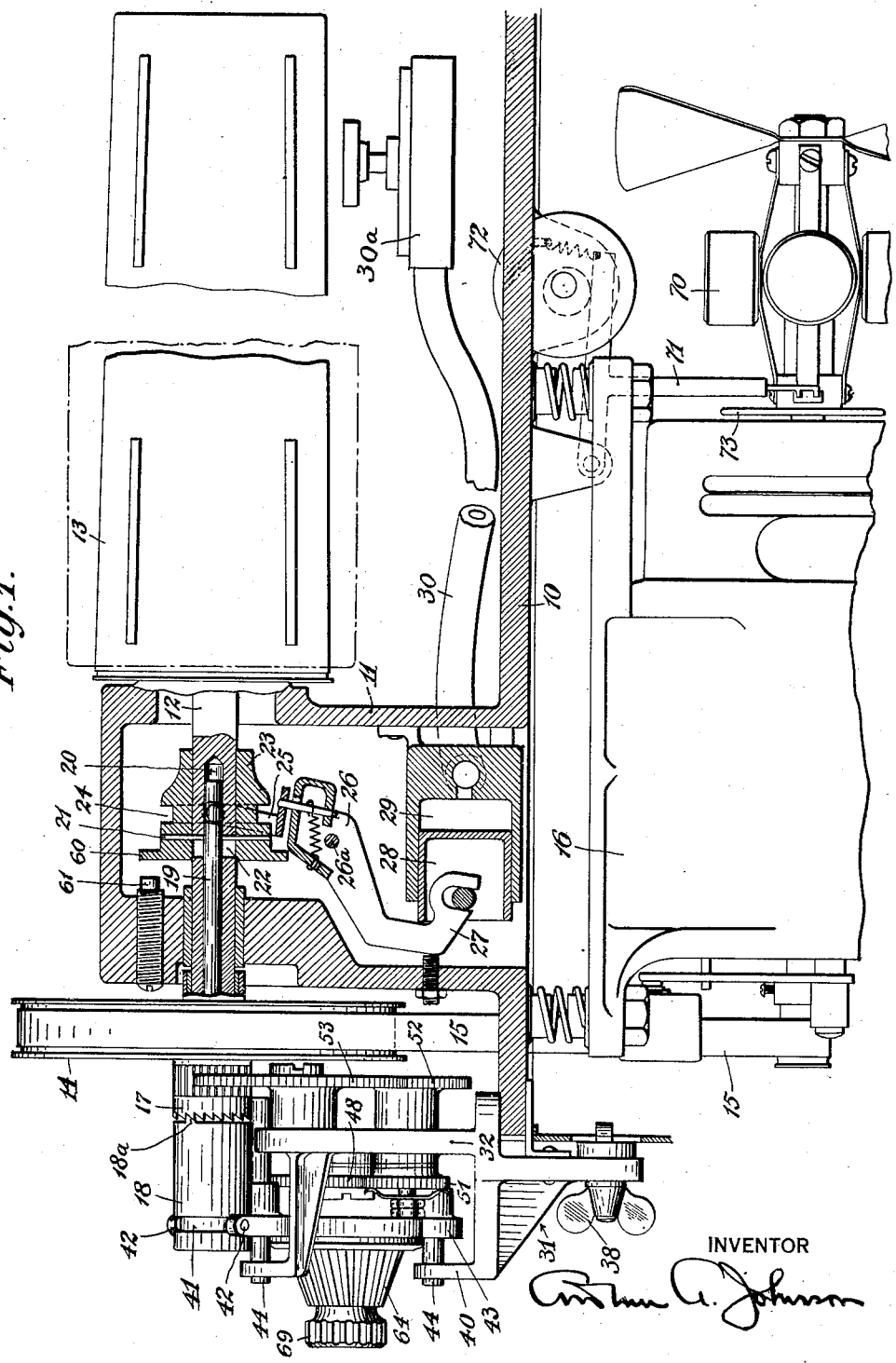

1,778,762

UNITED STATES PATENT OFFICE

ARTHUR A. JOHNSON, OF BRIDGEPORT, CONNECTICUT, ASSIGNOR TO DICTAPHONE CORPORATION, OF BRIDGEPORT, CONNECTICUT, A CORPORATION OF NEW YORK

AUTOMATIC CLUTCH CONTROL FOR PHONOGRAPHS

Application filed March 10, 1925. Serial No. 14,411.

This invention relates to phonographs, and in a more specific aspect to commercial phonographs usually used to record and reproduce dictation and other matter.

Commercial phonographs are usually provided with stop-and-start mechanisms, so that the phonograph will operate only when it is actually recording or reproducing sound and in reproducing a previously recorded record, so that the matter thereon may be transcribed on a typewriter. The start-and-stop mechanism usually comprises a device such as a pedal, which the transcriber maintains operated during all the time when it is desired to listen to the record. In other cases, the start-and-stop mechanism comprises a device which when operated once causes the machine to start, and when operated again causes the machine to stop. In these and other cases, the operator must by a conscious physical action control both the stopping and the starting of the phonograph.

The reproduction of dictation or other sounds by phonographs is usually at such a speed that the operator cannot continuously typewrite as fast as the phonograph reproduces the matter to be written. Therefore, the operator listens to a certain amount of dictation and then stops the machine and proceeds to write what she has listened to and memorized. While an experienced operator is listening to the dictation, she is already writing the beginning of it, and hence, she does not remember the entire amount of dictation listened to at one time, but only that portion of it which is to follow what she has already written while listening to the dictation.

The present invention provides for simplifying this control of the phonograph by the operator by making it unnecessary for the operator to stop the machine when a sufficient amount of dictation has been heard, it being only necessary for the operator to start the machine by a physical operation when she is again ready to listen to the reproduction of the record.

In other words, the present invention provides means for automatically stopping the phonograph after a predetermined amount of dictation has been reproduced.

Due to differences of natural ability to remember and quickly typewrite, the amount of dictation which one operator can take at one time differs from that which another operator can take. Accordingly, the present invention provides means whereby the length of the period of reproduction of the phonograph may be varied, preferably within wide limits, by an adjustable means provided by this invention on the phonograph for the purpose, and which may be set to the convenience of the particular operator using the machine.

In other words, the present invention provides means for variably controlling the amount of dictation which is to be reproduced before the phonograph is automatically stopped after each manual starting operation.

In order that the device of the present invention may be applied to existing phonographs without substantially changing them, it is so arranged according to this invention as to be placed upon such existing phonographs as an attachment.

Other objects and advantages will hereinafter appear.

In the accompanying drawings, which show one form of this invention as exemplary thereof—

Figure 1 is a front view, partly in section, showing the mandrel of a transcribing machine, means operated by the operator for starting the rotation of the mandrel, and the automatic stopping device of the present invention shown as applied to such machine.

Fig. 2 is a rear elevation, showing the device of the present invention as applied to a transcribing machine.

Fig. 3 is a side elevation, showing the device in the present invention and the means for applying it to a standard transcribing machine, the parts being shown in the positions they assume just as the automatic unclutching operation has taken place.

Fig. 4 is a detail sectional view of the device of the present invention, the parts being shown in the positions they assume just after the unclutching operation is effected.

Fig. 5 is a detail side view, partly broken away, showing the parts in the positions they assume during the operation of reproducing.

Fig. 6 is a similar view, showing the starting position of the automatic unclutching mechanism.

Fig. 7 is a view similar to Fig. 6, showing the positions of the parts when a maximum period of reproduction is desired.

Fig. 8 is a view similar to Fig. 6, but showing the positions of the parts when a minimum of reproduction is desired at a single operation.

The transcribing type of commercial phonographs, shown in the drawings, comprises a base 10 having a housing 11 adapted to support a shaft 12 for a mandrel 13 adapted to support a phonograph record. To drive the mandrel 13 and other parts of the machine to reproduce the sound recorded upon a phonograph record, there is provided a pulley 14 freely mounted on the shaft 12 and having a flexible belt 15 connecting it to a motor 16, see Fig. 1.

Although the pulley 14 continues to rotate so long as the motor 16 is running, the mandrel 13 and other parts of the phonograph are only rotated when it is desired to listen to matter recorded upon the record. For this reason, the pulley 14 is provided with a toothed-disk 17 adapted to be engaged by a cooperating clutch-member 18 secured to a rod 19 mounted in an opening 20 in the shaft 12, and connected to the shaft 12 by a pin 21 located in longitudinal slots 22 in the shaft 12. The arrangement is such that the clutch-member 18 may be moved longitudinally of the shaft 12 to move its tooth 18ª into and out of engagement with the toothed-member 17 of the pulley 14 so that the rotating movement of the pulley may be transmitted to the shaft 12 through the pin 21.

For the purpose of moving the clutch-member 18 into engagement with the toothed-disk 17 of the pulley, a grooved collar 23, loosely mounted on the shaft 12, is connected to the rod 19 by means of the pin 21. In the groove 24 of this collar, there is provided a shifter 25 mounted upon a controlling lever 26 pivoted at 26ª. The lower end of the controlling lever 26 is provided with an arm 27 engaging a piston 28 located in a cylinder 29. The cylinder 29 is connected by means of an air-hose 30 to a suitable operating device 30ª, usually in the form of a foot operated pump, diagrammatically indicated in Fig. 1.

When, by the operation of the operating device 30ª air is forced through the hose 30 to the cylinder 29, the piston 28 is pushed outwardly, moving with it the controlling lever 26, moving the shifter 25 inwardly of the machine and through its connection with the grooved-collar 23 drawing the clutch-member 18 into engagement with the toothed-disk 17 secured to the pulley. So long as the parts remain in these positions, the mandrel will continue to be rotated by the pulley 14 and the sound record will reproduce.

Heretofore, during the reproduction of the dictation of the cylinder, the operator would keep the operating device 30ª in operated position, so that the mandrel would continue to rotate so long as desired. The operator would remove her foot from the operating device 30ª when enough of the dictation was received and this would cause the retraction of the air in the hose 30 to draw the piston 28 inwardly and allow the clutch-member 18 to move away from the pulley 14 into inoperative position.

This required the operator to divide her attention between listening to the matter reproduced and operating or releasing the operating device when a sufficient amount of dictation had been received. This was disadvantageous, since the operator could not completely concentrate her mind on the transcribing of the dictation she was listening to and remembering the dictation she had heard and had not yet transcribed.

To avoid this disadvantage, the present invention provides means for automatically stopping the phonograph after a predetermined amount of dictation is reproduced. This means comprises means adapted to be set when the operation of reproducing is started; means adapted to time the duration of reproduction; and means adapted to cause or permit reproduction to stop after the expiration of such time.

The means adapted to be set when the reproduction is started may be operated by the piston 28 and cylinder 29, or any of its connected parts, preferably the clutch-member 18. The means for determining the duration of the reproduction may be any suitable timing device, such as clock-works, dash-pots, thermostats, etc., but preferably is so related to the mechanism of the phonograph that it is controlled by the rotation of the record support or mandrel. And the stopping or unclutching means may be operated by power obtained or stored up in any way, but preferably by the actual power of the phonograph.

The mechanism hereinafter described, which is added to the phonograph by the present invention, is preferably mounted in a support 31 comprising a vertically disposed plate 32 having a ledge 33 adapted to engage the base 10 of the phonograph. The support 31 also has a depending web 34 provided with fastening devices 35 adapted to pass through perforations 36 provided in the motor-casing 37 of the phonograph, and which devices 35, when secured by tightening wing-nuts 38, securely hold the support 31 in proper position upon the phonograph. Preferably, an angle bar 39 is secured to the depending portion 34 and is adapted to be interposed between the base 10 and the motor casing 37 so as to aid in firmly holding the support 31 upon the phonograph. In addition, the support 31 is provided with outwardly and upwardly extending arms 40.

The clutch-member 18 is connected with the device of this invention for control by the engagement in an annular groove 41 therein of pins 42 mounted in a controller 43 fixed to guide rods 44 slidably mounted in apertures in the plate 32 and arms 40 of the support 31. With this arrangement, the controller 43 is moved longitudinally of the phonograph with the clutch-member 18 and itself may control the positions of the clutch-member with relation to the toothed-member 17 of the pulley.

To hold the clutch-member 18 in operative engagement with the pulley, once it has been moved to that position by the operator against unclutching movement which would tend to take place, as above explained, when the operator releases the operating device 30ª connected with the cylinder 29 and piston 28, this invention provides a locking lever 45 adapted to engage a lug 46, or other part on the controller, see Fig. 3, and hold the controller in clutching position. This locking lever 45 is pivoted on a shouldered-screw 47 mounted in the plate 32 and is released by means hereinafter described only after a predetermined amount of dictation has been reproduced.

To time the duration of reproduction, or in other words the amount of dictation to be reproduced upon each manual operation of the clutch-member 18, there is provided a timing-disk 48 preferably located between the controller 43 and the plate 32 and rotatably mounted on a shouldered-screw 49 secured in the plate 32. This timing-disk 48 is geared to rotate with the pulley 14, and for this purpose has gear-teeth 50 meshing with a gear 51 which is coaxial with and connected to a gear 52 which in turn meshes with a gear 53, the latter meshing with a gear 54 preferably, but not essentially, formed on the toothed-member 17 which it will be remembered is secured to the pulley 14. This driving connection between the pulley and the timing disk does not always exist, but only when the timing disk should rotate, and for the purpose of allowing independent movement of the pulley with relation to the timing disk, a friction driving connection is provided between gears 51 and 52 which are not fixed together for rotation, and this is preferably in the form of a slip-clutch comprising a spider-spring 55.

The phonograph is caused to stop, when the pulley and the mandrel with its record have been rotated a predetermined amount, by the movement of the timing-disk 48 to a certain position. In this position, a pin 56 on the timing-disk engages an arm 57 on the locking lever 45 and moves the lever to release the lug 46 to thus permit the controller 43 to be shifted. At the same time, a cam 58 fixed on the timing-disk engages a cam 59 mounted on the controller 43 and shifts the latter sidewise to move the clutch-member 18 to inoperative position, that shown in Figs. 3 and 4, through the engagement of its pins 42 with the annular groove 41 of the clutch-member 18.

As soon as the clutch-member 18 is moved to inoperative position, the flange 60 of the grooved collar 23 engages a leather brake 61 and causes the mandrel and its record to stop, and thus stops reproduction of the dictation recorded on the record.

The stopping cams 58 and 59 and the pin 56 and arm 57 engage each other but once in each revolution of the timing-disk 48, and, if this were all that was provided, the time interval of reproduction would be controlled solely by the speed of rotation of the pulley 14 and the ratio of the gearing between the pulley and the timing-disk. But, while this in itself would be advantageous, it is preferable that the time interval of reproduction, that is the amount of dictation reproduced at one time, be variable to suit the needs of different operators. A bright and experienced operator may be capable of remembering a great deal of dictation, while the novice would find difficulty in remembering even small amounts of dictation, hence the desirability of making the time interval of reproduction variable.

So that even the most experienced operator may be accommodated by the present invention, the ratio of gearing between the pulley 14 and the timing-disk 48 is such that the timing-disk makes one revolution for a very large number of revolutions of the mandrel.

The time interval of reproduction may be controlled by any suitable change-speed mechanism by means of which the angular speed of the timing-disk 48 may be varied with respect of the angular speed of the pulley 14. However, present experience would seem to indicate that it is preferable that the time interval be varied by changing the angular movement which the timing-disk is allower to make for each reproduction interval. For instance, the time interval may be controlled by allowing the timing-disk to move from a certain fixed unclutching position to a variable stopping position in which the cams 58 and 59 engage. Again, while this construction would be satisfactory, it is preferable that the unclutching position of the timing-disk 48 be fixed while the starting position be varied to increase or decrease the time interval of reproduction.

Accordingly, the present invention provides a stop-member 62 on the timing-disk 48 and a cooperating stop member 63 which is preferably secured to a dial 64 mounted on the controller 43 and adapted to be secured thereto in any adjusted position, the stop 63 passing into position to engage the stop 62 through an opening 65 in the controller 43. The dial 64 carrying the stop 63 is adjustably mounted and is provided with a graduated index portion 66 cooperating with a pointer 67. The dial is rotatably mounted on a screw 68 threaded in the controller 43 and is adapted to be locked in adjusted position by means of a knob 69 secured to the screw 68 and adapted to clamp the dial 64 tightly against the controller 43 when the knob 69 is rotated in one direction and to free the dial when the knob is rotated in the other direction.

In first adjusting the device for use, the operator sets the dial 64 at some point substantially mid-way between its highest and lowest graduation. Then, she operates the phonograph to ascertain whether or not this is satisfactory. If too much dictation is given, she then loosens the dial by rotation of the knob 69 and moves the dial until a lower graduation appears opposite the pointer 67. After trying the phonograph and the device in this way several times, the operator will obtain a satisfactory adjustment. As the operator increases in efficiency she can, of course, re-adjust the dial 64 to increase the time interval of dictation, as desired.

Returning now to the mode of operation of the stops 62 and 63, these are so arranged with respect of each other, than in unclutched position, that shown in Fig. 4, the stops 62 and 63 will lie in the same plane. After the member 18 has been unclutched from the pulley 14, which is the position shown in Fig. 4, the timing-disk 48 continues to rotate, and this rotation proceeds while the operator is writing what she has already heard until the stop 62 engages the stop 63, when further rotation of the timing-disk is prevented. This stopping of the timing-disk is permitted without stopping the motor and the pulley 14 by reason of the provision of the slip-clutch between the gears 51 and 52 in the train of gearing between the pulley and timing-disk. When the timing-disk 48 has stopped, the slip-clutch of which the spider-spring 55 forms a part, slips and allows the timing-disk to remain in its arrested position, the position of rest shown in Figs. 6, 7 and 8. Fig. 6 shows the stop 63 in a midway position and Fig. 7 shows the stop in substantially maximum reproducing position, while Fig. 8 shows the stop 63 in a minimum reproducing position.

It will be seen from an inspection of Fig. 7 that the timing-disk makes substantially a complete revolution from the position in which it is shown before the cams 58 and 59 engage to shift the clutch to inoperative position, that the extent of movement from this unclutching position to the stopping position is very slight, and that the extent of movement which the timing-disk has while the mandrel is rotating is relatively large. When the dial is adjusted as shown in Fig. 8, the extent of movement which the timing-disk has before the cam 58 engages the cam 59, is very slight while the subsequent extent of movement after the unclutching has taken place is relatively large.

When the clutch-member 18 moves inwardly of the machine to start the phonograph the controller 43 moves with it, and by this movement, the stop 63 which is carried by the controller is moved out of the plane in which the stop 62 is located. Hence, the stops 62 and 63 may pass each other and thus allow the timing-disk 48 to rotate. The timing-disk 48 is then permitted to rotate until its cam 58 engages the cam 59 on the controller 43 and this causes the controller to be moved outwardly of the phonograph to stop it and to bring the stop 63 into the path of the stop 62. The timing-disk 48, after moving the clutch-member 18 to unclutching position, continues to rotate until its stop 62 engages the fixed stop 63 on the controller. Then the device is again brought to rest ready for the next operation by the operator.

Preferably, the phonograph is provided with speed-regulating and controlling mechanism, see Fig. 1, which may comprise a governor 70 having a brake device 71 and a manually operable controlling device 72 by means of which the speed of rotation of the mandrel may be varied. Normally, the action between the governor 70 and its brake causes the speed of the phonograph to be constant, but this constant speed may be varied by the operation of the controlling device 72 to move the brake device 71 closer to or farther from the brake-disk 73 of the governor.

It will thus be seen that the present invention provides means not only for causing the phonograph record to rotate a predetermined number of times before the phonograph is stopped, but also provides means whereby the speed of rotation of the phonograph so controlled may be varied. Hence, the controller provided by the present invention not only determines the amount of dictation relative to the phonograph, but, by adjustment of the controlling device 72, also according to time.

Variations and modifications may be made within the scope of this invention, and portions of this improvement may be used without others. For instance, the control device provided for the present invention may be made to operate parts other than the clutch either with or without its operation of the clutch, as desired.

Having now described the invention, what is claimed as new, and for which it is desired to obtain Letters Patent is:

1. In a phonograph, a record-support; driving means therefor; a clutch for connecting said record-support and said driving means; means for making said clutch effective; means for locking said clutch in effective position; means automatically unlocking said clutch after a predetermined operation of said record-support; means for making said clutch ineffective and manually adjustable means for varying the operation of said means automatically unlocking said clutch.

2. In a phonograph, an automatic clutch-control comprising a revoluble controlling disk; means carried by the disk for causing the clutch to be moved to inoperative position; and means for stopping the movement of the disk after a predetermined extent of movement subsequent to the clutch being moved to its inoperative position.

3. In a phonograph, automatically operated means for causing the phonograph to operate for a predetermined time, said means being operated by the phonograph and concomitantly therewith; and means for varying the speed of rotation of the phonograph to vary the quantity of reproduction produced per unit of time.

4. In a phonograph, automatically operated means for causing the phonograph to operate for a predetermined time only; settable means for varying the duration of said time; and means for indicating the setting of the last-named means, and means for varying the speed of operation of said phonograph.

5. In combination in a device of the character described, a record support, means for driving said record support, a clutch for connecting the driving means to the record support, means for actuating the clutch to cause the driving means to engage the record support, a rotatable control member connected to the driving means through the medium of a slip clutch, means adapted to lock the control member against rotation, means actuated simultaneously with the first mentioned clutch to release the said locking means to allow rotation of the control member, and means mounted on the control member adapted to actuate the first mentioned clutch to disengage the driving means from the record support.

6. In combination in a device of the character described, a record support, means for driving said record support, a clutch for connecting the driving means to the record support, means for actuating the clutch to cause the driving means to engage the record support, a rotatable member connected to the driving means through the medium of a slip clutch, means adapted to lock the rotatable member against movement, means actuated simultaneously with the first mentioned clutch to release the said locking means to allow movement of the rotatable member, and means mounted on the rotatable member and adapted to operate after a predetermined movement thereof to actuate the first mentioned clutch to disengage the driving means from the record support.

7. In combination in a device of the character described, a record support, driving means therefor, a clutch for connecting the driving means to the record support, means for actuating the clutch to cause the driving means to engage the record support, locking means for maintaining this engagement, a rotatable member connected to the driving means through the medium of a frictional clutch, means adapted to lock the rotatable member against movement, means actuated simultaneously with the first mentioned clutch to release the second mentioned locking means to allow movement of the rotatable member, and means mounted on the rotatable member and adapted to operate after a predetermined movement thereof to release the first mentioned locking means and to disengage the driving means from the record support.

8. In combination in a device of the character described, a record support, means for driving said record support, a clutch for connecting the driving means to the record support, means for actuating the clutch to cause the driving means to engage the record support, a control member operatively connected to the driving means, means adapted to lock the control member against movement, means actuated simultaneously with the first mentioned clutch to release the said locking means to allow movement of the control member, and means mounted on the control member and adapted to operate after a predetermined movement thereof to actuate the first mentioned clutch to disengage the driving means from the record support.

9. In combination in a device of the character described, a record support, means for driving said record support, a clutch for connecting the driving means to the record support, means for actuating the clutch to cause the driving means to engage the record support, a rotatable control member connected to the driving means through the medium of a slip clutch, means adapted to lock the control member against movement, means actuated simultaneously with the first mentioned clutch to release the said locking means to allow movement of the control member, and means mounted on the control member and adapted to operate after a predetermined movement thereof to prepare the locking means to lock the rotatable member against further movement when it has completed one revolution.

10. In combination in a device of the character described, a record support, means for driving said record support, a clutch for connecting the driving means to the record support, means for actuating the clutch to cause the driving means to engage the record support, a rotatable member connected to the driving means through the medium of a slip clutch, means adapted to lock the rotatable member against movement, means actuated simultaneously with the first mentioned clutch to release the said locking means to allow movement of the rotatable member, and means mounted on the rotatable member and adapted to operate after a predetermined movement thereof less than one complete revolution to actuate the first mentioned clutch to disengage the driving means from the record support and to simultaneously prepare the locking means to lock the rotatable member against further movement when it has completed one revolution.

11. In combination in a device of the character described, a record support, means for driving said record support, a clutch for connecting the driving means to the record support, means for actuating the clutch to cause the driving means to engage the record support, a rotatable control member connected to the driving means through the medium of a frictional clutch, means adapted to lock the control member against movement, means actuated simultaneously with the first mentioned clutch to release the said locking means to allow rotation of the control member, and means mounted on the control member and adapted to operate after a first predetermined rotation thereof to actuate the first mentioned clutch to disengage the driving means from the record support and to simultaneously prepare the locking means to lock the control member against further rotation after a second predetermined rotation thereof.

12. In combination in a device of the character described, a record support, means for driving said record support, a clutch for connecting the driving means to the record support, means for actuating the clutch to cause the driving means to engage the record support, a rotatable member connected to the driving means through the medium of a slip clutch, means adapted to lock the rotatable member against movement, means actuated simultaneously with the first mentioned clutch to release the said locking means to allow movement of the rotatable member, means mounted on the rotatable member and adapted to operate after a predetermined movement thereof less than one complete revolution to actuate the first mentioned clutch to disengage the driving means from the record support and to simultaneously prepare the locking means to lock the rotatable member against further movement when it has completed one revolution, and adjustable means adapted to control the operation of the means mounted on the rotatable member.

13. In a phonograph, in combination, a record support, driving means therefor, a clutch for connecting said record support and said driving means, means for manually actuating said clutch to cause the driving means operatively to engage the record support, means for locking said clutch in operative position for a pre-determined interval, and means for automatically unlocking and positively releasing the clutch at the end of the time interval.

14. In a phonograph, in combination, a record support, driving means therefor, a clutch for connecting said record support and said driving means, manual means for actuating said clutch to cause the driving means operatively to engage the record support, means for locking the clutch in actuated position, and means for automatically unlocking and positively releasing the clutch after a pre-determined movement of the record support.

15. In a phonograph, in combination, a record support, driving means therefor, a clutch for connecting said record support and said driving means, manual means for actuating said clutch to cause the driving means to engage the record support, means for locking said clutch in operative position for a pre-determined time interval, means for automatically unlocking and positively releasing said clutch at the end of said time interval and means for adjusting the last mentioned means to vary the length of the pre-determined time interval.

16. In a clutch for phonographs, in combination, a continuously running clutch member, a second clutch member adapted to be engaged therewith, a disk rotatable with said first clutch member, means carried by the disk adapted to cause the second clutch member to be moved out of engagement with the first clutch member, and adjustable means adapted to stop the rotation of said disk subsequent to the disengagement of said clutch and to control the starting position of said disk when said clutch parts are reengaged.

17. A dictation machine comprising in combination, means for manually starting the machine, and automatic stop and start control mechanism comprising abutment members angularly movable relative to one another, one of said members being adjustable relative to the other to determine the interval of operation of the machine after each actuation of the manual starting means.

Signed at Bridgeport, in the county of Fairfield and State of Connecticut, this 9th day of March, 1925.

ARTHUR A. JOHNSON.